Nov. 22, 1960

P. GREGER 2,960,921

PHOTOGRAPHIC CAMERA

Filed Feb. 3, 1959

INVENTOR
PAUL GREGER

BY Mock+Blum
ATTORNEYS

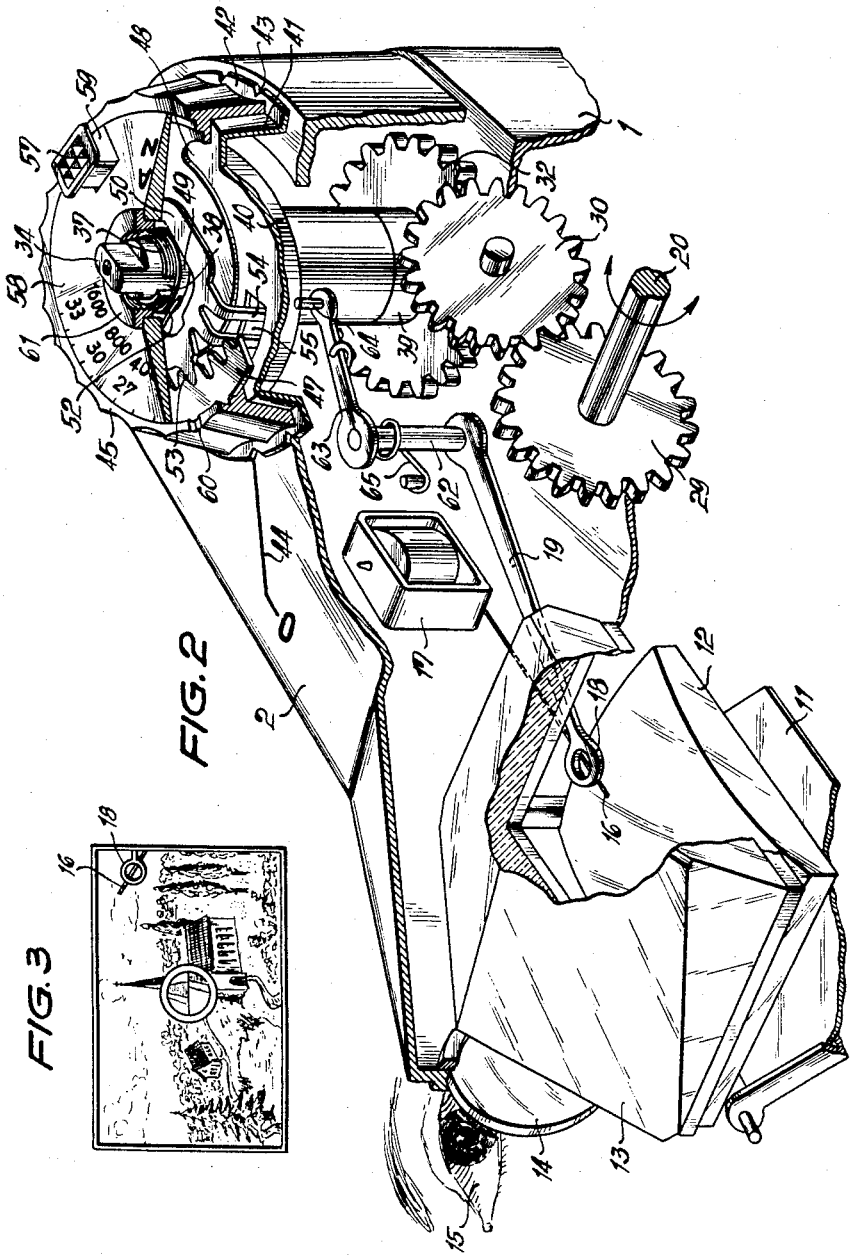

Nov. 22, 1960  P. GREGER  2,960,921
PHOTOGRAPHIC CAMERA
Filed Feb. 3, 1959  4 Sheets-Sheet 3
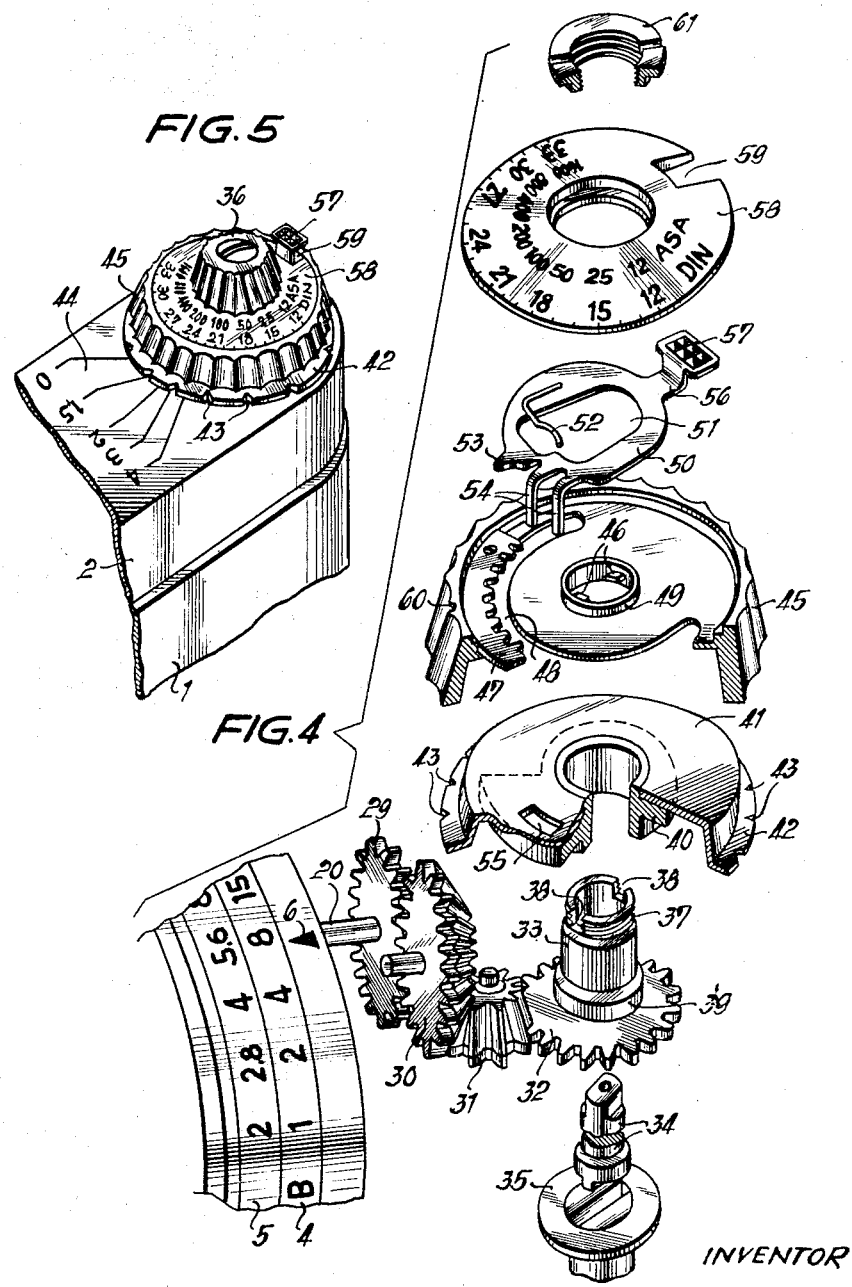
INVENTOR
PAUL GREGER
BY Mock+Blum
ATTORNEYS

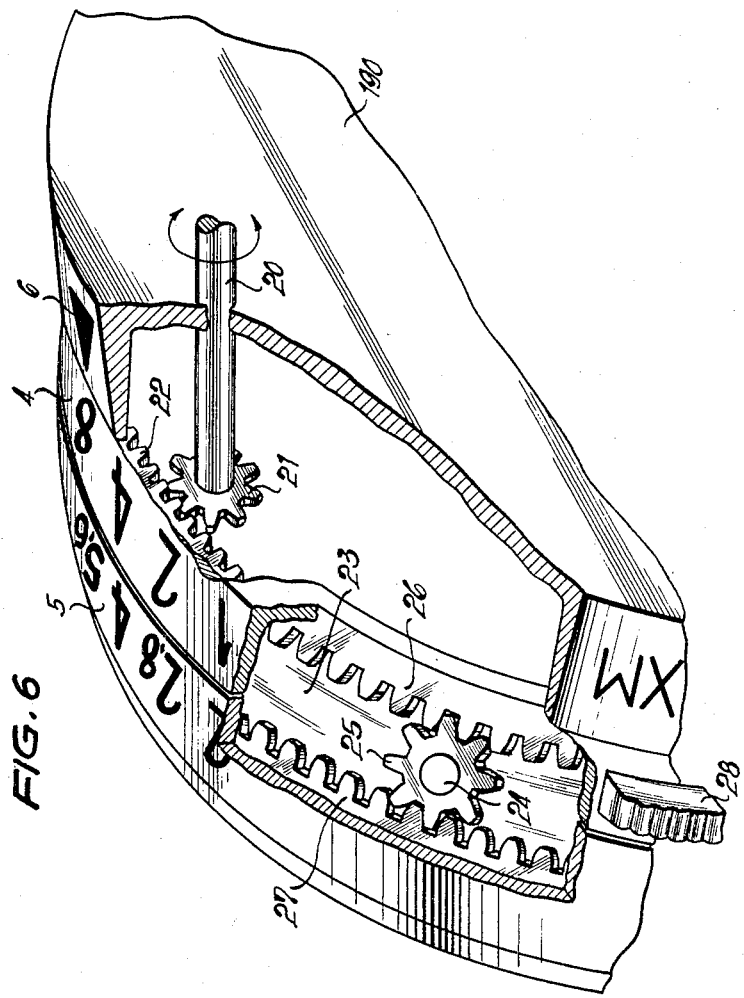

United States Patent Office 2,960,921
Patented Nov. 22, 1960

2,960,921

PHOTOGRAPHIC CAMERA

Paul Greger, Braunschweig, Germany, assignor to Voigtlander A.G., Braunschweig, Germany, a corporation of Germany Filed Feb. 3, 1959, Ser. No. 790,904

Claims priority, application Germany July 4, 1958

9 Claims. (Cl. 95—10)

This invention relates to photographic cameras and it has particular relation to photographic cameras having an adjusting means for two mechanisms which are adjustable simultaneously and in dependence on each other, whereby one of said mechanisms contains parts coupled with each other by means of gearing, while the other mechanism due to its mechanical structure, is free from play in itself.

In the use of conventional simple gears or gears and racks, the mechanism containing these parts has a lost motion or play, while the other mechanism due to its mechanical structure, can react without play to the movements of the adjusting means. It is, therefore, not possible that both mechanisms simultaneously follow the movements of the adjusting handle. This defect could be eliminated by the use of conventional gears which are free from play, but such gears require considerable expenditures.

It is the main object of the present invention to construct a mechanism of the above mentioned type without particular mechanical expenditure in such manner that the mechanisms simultaneously follow every movement of the adjusting handle at all times so that there will be no relative displacement of the two mechanisms.

It is contemplated according to the present invention to provide in the mechanism which is free from play a regulating device, by means of which said mechanism is adjustable to the same play which is present in the mechanism containing gearing. Thus, to the mechanism which is free from play due to its mechanical structure, a play is imparted, which corresponds to the play of the mechanism containing, for example gears, or gears and racks, so that the parts to be displaced by the two mechanisms have always the same play relative to the adjusting means and, therefore follow the adjusting movements of said means always only simultaneously.

It is of particular advantage if in the abovementioned construction the adjusting means consists of a setting button arranged in the camera body and said button is coupled with a mechanism for adjustment of the exposure value adjusting member of the shutter, as well as with a mechanism by means of which an indicator, which has to follow up the pointer of an exposure meter, is adjustable. In this case it is indispensable that upon each movement of the follow-up indicator, a corresponding adjustment of the means for adjusting the exposure value of the shutter also occurs, or vice versa. According to an advantageous embodiment, said button is coupled by a gear train, with the shutter means for adjusting the exposure value, and, additionally, connected with a cam disc for moving the follow up indicator. It has been found to be of advantage to insert the regulating device, which is adjustable to the play within the gear train chain, in the connection between said setting button and the cam disc. Furthermore, it is of particular advantage to combine this regulating device structurally with an adjusting device by means of which the cam disc is displaceable relative to the setting button in order to take into consideration the film sensitivity value.

The appended drawings and the following description and claims describe, by way of example, an embodiment of and a best mode for carrying out the invention, but to which the invention, is not limited. It will be appreciated that the invention is not limited to a single lens mirror reflex camera described in the following example and can be applied to cameras of other types.

In the appended drawings:

Fig. 2 shows, in perspective illustration, a partial view of the upper part of the camera shown in Fig. 1 with the camera cap being partially broken away;

Fig. 3 is an image appearing in the finder to the user of the camera;

Fig. 4 is an exploded perspective view of the individual parts of the adjusting device shown in Figs. 1 and 2;

Fig. 5 is a partial perspective view of the upper side of the camera and those parts of the adjusting device which are accessible to the operator's hand and;

Fig. 6 is a partial perspective view of the wall of an objective shutter, which is turned toward the camera body the casing of the shutter being partially broken away.

Figure 1:
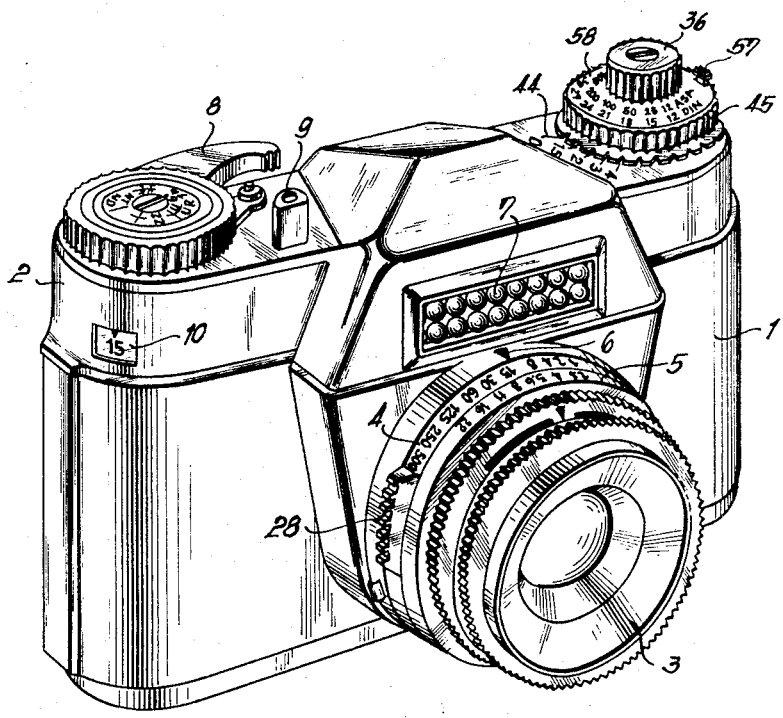
Fig. 1 is a perspective view of a camera containing devices embodying the present invention.

The camera illustrated in the drawings is a single lens mirror reflex camera having, i.e. a camera in the path of rays between the picture taking objective and the light sensitive layer, a swingable mirror which—in its position swung into the path of rays—deflects the light into a finder device. After removing said mirror from the path of rays, the light can pass to the light sensitive layer. Broadly speaking, cameras of this type have been known from the art.

Referring now to the drawings in detail, reference symbol 1 denotes the body of a camera, the upper narrow side of which is covered by a camera cap 2. The objective mount body 3 forms a structural unit with an objective shutter, the adjusting rings of which, for exposure time and diaphragm, are denoted 4 and 5, respectively. The scales for exposure time and diaphragm, provided on these rings, cooperate with a common stationary mark 6. Above the objective mount body 3, the photocell 7 of an electric exposure meter, built-in in the camera cap 2, is arranged. A film advancing lever 8, a shutter release key 9 and a window 10 for exhibiting the counting disc of a film counting mechanism, are also shown in Fig. 1. On the other end of the camera cap, the adjusting knobs of a device (which is described in more detail further below) for adjustment of the exposure value in conformity with the value indicated by the exposure meter, can be seen.

Figure 2 illustrates—on an enlarged scale in comparison with Fig. 1—only the camera cap part which contains said last mentioned adjusting device. In addition to this device, Fig. 2 also shows mirror 11, which is swung into the path of rays of the objective and reflects the rays, passing through the objective, to a field lens 12 which is seated in camera body 1 and produces an image. Arranged above the field lens 12 are a prism 13 and an ocular 14, through which the eye 15 can observe the image produced by lens 12, in upright and laterally correct position. The pointer 16 of the measuring instrument 17 connected with photocell 7 (Fig. 1) and a follow-up indicator or mark 18 (which is the free end of a lever 19), project into the space between field lens 12 and prism 13. In this manner, the eye looking through ocular 14, can see the pointer 16 and indicator 18 even near the margin of the finder image, as shown in Fig. 3.

Adjusting rings 4 and 5 for exposure time and diaphragm, respectively, can be displaced by means of the adjusting device seated in the camera body 1. For coupling with this device, the shutter has a shaft 20, which projects from its wall 190, turned toward the camera body 1 (see Fig. 6). This shaft 20 is coupled with the adjusting device shown in detail in Fig. 4. The free end of shaft 20, which is located within the shutter casing, carries a pinion 21, which meshes with gear teeth on the inner periphery of a setting ring 23. A pinion 25, which is rotatable about pin 24, is arranged on the outer surface of ring 23. This pinion 25 meshes with gear teeth 26 provided in exposure time adjusting ring 4, on the one hand, and with gear teeth 27 provided on the diaphragm adjusting ring 5, on the other hand.

If by rotation of shaft 20 ring 23 is caused to move, pinion 25—due to its engagement with gear teeth 26 and 27—will conjointly rotate rings 4 and 5 for the adjustment and diaphragm, respectively, in the same direction of rotation, whereby the adjustment of exposure value is changed because, upon the adjustment of increasing exposure times, simultaneously the diaphragm opening is increased, and vice versa. The combination of exposure time and diaphragm adjusted in this manner, can be changed—while maintaining the adjusted exposure value—to another combination, if, by means of handle 28 provided on exposure time adjusting ring 4, the position of ring 4 is changed, without rotation of shaft 20. By proceeding in this manner, gear teeth 26 effect, through pinion 25, rotation of diaphragm adjusting ring 5 in a direction which is opposite to the direction of movement of exposure time adjusting ring 4. Upon displacement of the exposure time adjusting ring 4 from a certain value to a value of double length, the diaphragm value will be reduced by one value so that the exposure value will not be changed.

The shaft portion 20 projecting from rear wall 190 of the shutter casing carries a pinion 29, which (as best shown in Fig. 4) is coupled with a gear 32 over intermediate combination spur and bevel gears 30 and 31. This gear 32 is rotatably arranged, as shown in Fig. 2, in the upper side of the camera body 1, said upper side being overlapped by camera cap 2. As can be seen from Fig. 4, gear 32 is fixedly connected with a tubular member 33.

Through this member 33, a shaft 34 extends, which is seated in camera body 1 and forms the shaft also for a film spool 35 arranged in camera body 1. This shaft 34 passes through all parts shown in exploded relation in Fig. 4 and has on its free end a knurled button-like end portion 36 (see Figs. 1 and 5) which serves as a knob for the film feed.

The free end of tubular member 33 has an outer thread 37 and is provided also with two recesses 38 and a collar 39. Loosely arranged around tubular member 33 and seated on collar 39 in assembled condition of the adjusting device, are a cam disc 40 and, fixedly connected to the latter, a setting disc 41, on the outer marginal edge 42 of which uniformly distributed marks 43 are arranged. As described in more detail further below, the latter serve as adjusting marks relative to a scale 44 arranged on the outer side of camera cap 2 (see Figs. 1, 2 and 5).

A setting button 45 also shown in Fig. 4, can be placed on tubular member 33, whereby two cams 46 provided on member 45 engage recesses 38 of tubular member 33. Thereby member 45 will be connected, secured from rotation, with member 33 and thus connected—over gears 32, 31, 30 and pinion 29—also with shaft 20. Member 45 has a knurled surface which partially overlaps disc 41, but does not cover the outer peripheral surface 42 thereof, as best shown in Fig. 5. To member 45 a gear segment 47 is fastened, parallel to which a kidney-shaped recess 48 extends. Furthermore, member 45 has a tubular extension 49, which forms a bearing for a coupling slide 50. The latter is provided with an elongated recess 51, which encloses extension 49. By lying against member 49, a spring 52 fixedly connected with member 50, keeps in engagement a tooth 53 provided on member 50, with said gear segment 47, so that member 50 participates in each displacement of member 45. Seated on member 50 are two coupling arms 54, which pass through the kidney-shaped recess 48 provided in member 45 and engage a recess 55 in member 41 and in cam disc 40. In this manner, with regard to the rotation a lost motion connection is established between button 45 and disc 41, on the one hand, and cam disc 40, on the other hand.

Member 50 is provided also with an angle arm 56, which is provided with a handle member 57. By engaging the latter, member 50 can be displaced, against the effect of spring 52, perpendicularly to its axis, whereby tooth 53 is disengaged from gear segment 47 so that the non-rotatable connection between button 45 and member 50, is released. After the release of handle member 57 tooth 53 of member 50 is caused by spring 52 to engage again gear segment 47.

Above member 50 a scale disc 58 is arranged. This disc has a recess 59, which is adapted to be engaged by angle arm 56 of member 50. There by a connection prevented from rotation is established between disc 58 and member 50. Scale disc 58 carries film sensitivity scales in DIN and ASA values and the lines of these scales can be adjusted and read relative to a mark 60 provided on member 45.

The elements individually illustrated in Fig. 4 are assembled in the above described manner and are held in assembled condition by a threaded ring 61 which is applied to the outer thread 37 of tubular member 33. As already mentioned above, all of these parts are arranged on shaft 34, the free end of which carries film rewind knob 36. Figures 1 and 5 show the adjusting device in assembled condition.

As can be seen from Fig. 2, the lever 19, which carries the follow-up mark 18, is arranged on a shaft 62, which is rotatable in camera body 1 and on which a scanning or contact lever 63 provided with a scanning or contact pin 64 is seated. Due to the effect of a spring 65 which acts on lever 63, pin 64 is held in permanent engagement with cam disc 40.

Thus, upon turning adjusting or setting button 45, through the gear train composed of gears 29—32, the shutter, and simultaneously, by means of cam disc 40, the follow-up mark 18, will be displaced.

The parts are tuned to each other in such a manner that when the follow-up mark 18 is incoincidence with pointer 16 of the exposure meter, as shown in Fig. 3, the shutter will be adjusted to an exposure value corresponding to the prevailing light conditions, i.e. to an exposure value which represents a combination of exposure time and diaphragm, which is in conformity with said exposure value. If this adjusted combination is not suitable for the contemplated photographic picture-taking then, in the manner already described above and with maintenance of the adjusted exposure value, by direct rotation of exposure time adjusting ring 4, another combination of exposure time and diaphragm value can be set, whereby the position of follow-up mark 18 does not change.

The film sensitivity value is taken into consideration by imparting to the follow-up mark 18 a predetermined fixed preliminary adjustment which is given to shaft 20 which brings about adjustment of the exposure value. This is done by changing the position of cam disc 40 relative to the setting button 45. As already mentioned above, the connection between these two parts is brought about by coupling slide 50. If by gripping and displacing grip member 57, tooth 53 of coupling slide 50 is removed from its engagement with rack gear segment 47 on the setting button 45, then upon turning coupling slide 50 relative to setting button 45, cam disc 40 will also be turned. Also participating in this rotation is scale disc 58, the scale of which moves relative to mark 60 on setting button 45. When the sensitivity value of the film used is located opposite mark 60, then member 57 is released so that its tooth 53 will engage again gear segment 47 under the effect of spring 52 and fixed connection between setting button 45 and cam disc 40 will be established again.

Filters placed in front of the picture taking objective, require a change of the exposure value determined by adjustment of the follow-up mark 18 to pointer 16. As can be seen from Fig. 5, scale 44 provided on camera cap 2 is calibrated according to filter factors, and said scale 44 cooperates with marks 43 of setting disc 41. If mark 18 follows up the deflected pointer 16 which is set in accordance with the exposure value corresponding to the prevailing light conditions, and if for the contemplated photographic picture taking a filter with a filter factor of, for example, "2" is used, then this factor "2" is taken into consideraiton by turning setting button 45 to such an extent that mark 43 which is just opposite to scale line "0," will be adjusted to scale line "2" of said scale 44. Thereby the exposure value on the shutter is changed in conformity with said filter factor of "2."

It is known that a gear train designed for operation in both directions of rotation and consisting of gears only, cannot be entirely free from play. Such play is present also in the above described adjusting device, between adjusting button 45 and shaft 20 on the shutter. As, upon displacement of setting button 45, follow-up mark 18 is displaced, it could happen that the movement or displacement of shaft 20 would not be in correspondence with the movement or displacement of follow-up mark 18, and thus that there would not be an adjustment of the exposure value corresponding accurately to the displacement of the follow-up mark 18. In order to avoid this discrepancy, the connection between setting button 45 and cam disc 40, which controls the follow-up mark 18, is not rigid, but contains the same play as that present between setting button 45 and shaft 20 on the shutter. The connection between setting button 45 and cam disc 40 is established by coupling slide 50, the coupling arms 54 of which engage the recess 55 of setting disc 41 and of cam disc 40. The recess 55 extends over such a large angle range that the coupling slide 50 can turn relative to cam disc 40 and setting disc 41 before an engagement between one of the coupling arms 54 and a lateral limiting edge of recess 55 occurs. The amplitude of this play of coupling arms 54 within recess 55 can be adjusted to the play within gear train 29—32, by bending coupling arms 54 in a direction towards each other, or in a direction away from each other. Thus, due to such adjustment—which has to be made during assembling the device—it can be attained that upon a rotation of setting button 45 the follow-up mark 18 will start to move at a moment when, after overcoming of the play within the gear train 29—32, the shaft 20 of the shutter is displaced. Therefore, in spite of the play, upon turning setting button 45 always only a simultaneous displacement of follow-up mark 18 and of shaft 20 will take place.

Thus, the camera embodying the present invention is operated as follows:

After adjustment of scale disc 58 to the sensitivity value of the film used, upon looking through the finder ocular 14, at the same time photocell 7 is also exposed to the light rays incident from the scene to be photographed. This will result in a deflection of the exposure meter pointer 16 which can be seen on the margin of the finder image and to which the follow up mark 18, which is likewise visible on the margin of the finder image, is then adjusted by turning button 45. At the same time, the exposure time and diaphragm value is adjusted in conformity with the correct exposure value. If desired, the exposure time-diaphragm combination thus adjusted can be changed, by turning the exposure time adjusting ring 4, to another combination of exposure time and diaphragm, but still in conformity with the same exposure value. If in the contemplated photographic picture taking a filter is used, its filter factor is also taken into consideration by displacement of button 45 with reference to mark 43 and scale 44. In the subsequent release of the shutter, a correct exposure of the light sensitive material in conformity with the prevailing light conditions will be obtained.

It will be understood from the above that this invention is not limited to the specific constructions, designs, steps and other details specifically described above and illustrated in the drawings and can be carried out with various modifications without departing from the scope of the invention as defined in the appended claims.

What is claimed is:

1. A photographic camera comprising, in combination, a pair of members conjointly adjusted during setting of exposure conditions; adjusting means for conjointly adjusting said members; a pair of mechanisms respectively connecting said adjusting means to said members; one of said mechanisms transmitting motion of said adjusting means to one member without play, and the other mechanism including a gear train connecting said adjusting means to the other member, said gear train having play therein; and an adjustable lost-motion connection between said adjusting means and said one mechanism to delay operation of said one mechanism by said adjusting means until the play in said gear train has been taken up by movement of said adjusting means; whereby said members are moved in synchronism by said adjusting means.

2. A photographic camera as claimed in claim 1, including an exposure meter having a pointer; and a shutter having an exposure value adjusting member; one of said first and second mechanisms serving for displacement of the exposure value adjusting member of the shutter constituting one of said members, and the other of said first and second mechanisms serving for displacing a follow-up mark adapted to follow up the pointer of the exposure meter, said follow-up mark constituting the other of said members; and the adjusting means consisting of a setting button which is arranged on the camera body and coupled with both of said mechanisms.

3. A photographic camera as claimed in claim 2, in which the mechanism connecting said setting button to the exposure value adjusting member constitutes said other mechanism including a gear train; said one mechanism including a cam, and a cam follower movable with the follow-up mark; said adjustable lost-motion connection interconnecting said cam and the setting button.

4. A photographic camera as claimed in claim 3, comprising means for adjusting the cam disc relative to the setting button in order to take into consideration the film sensitivity value; said means including an element of said lost-motion connection.

5. Photographic camera as claimed in claim 3, in which said gear train includes a gear connected with the exposure value adjusting member of the shutter, said gear being rigidly coupled with the setting button; the cam disc being arranged coaxially with the setting button and being provided with a recess; said lost-motion connection including said recess and a coupling slide connected with the setting button and having a first and a second coupling arm which are adapted to project with play into said recess; said first and second coupling arm being adapted to establish a lost-motion driving connection between the setting button and the cam disc, by alternately engaging, in dependence on the direction of rotation, one of the lateral limiting edges of said recess, whereby the amplitude of play of said coupling arms within said recess is adjustable to the play in said gear train.

6. Photographic camera as claimed in claim 5, in which the amplitude of the play of the coupling arms is adjustable by correspondinly bending said coupling arms.

7. A photographic camera as claimed in claim 5, in which the coupling slide is displaceable relative to the setting button with reference to a scale of film sensitivity values.

8. A photographic camera as claimed in claim 7, in which said coupling slide is displaceably and rotatably arranged relative to the setting button and has a coupling tooth; a spring acting on said tooth; a gear segment fixedly connected with the setting button; said tooth being held in engagement with said rack by the action of said spring; said tooth being connected with a scale disc provided with a film sensitivity scale for cooperation with a fixed mark provided on the setting button.

9. A photographic camera as claimed in claim 1, in which the camera is a single lens reflex camera.

References Cited in the file of this patent

UNITED STATES PATENTS

| | | |
|---|---|---|
| 2,148,963 | Rauch | Feb. 28, 1939 |
| 2,188,820 | Risdorfer | Jan. 30, 1940 |
| 2,206,626 | Blechner | July 2, 1940 |
| 2,222,292 | Gorlich | Nov. 19, 1940 |
| 2,887,026 | Rentschler | May 19, 1959 |